US008181391B1

(12) United States Patent
Giacomantonio

(10) Patent No.: US 8,181,391 B1
(45) Date of Patent: May 22, 2012

(54) VERTICAL AQUAPONIC MICRO FARM

(75) Inventor: Paul Giacomantonio, Half Moon Bay, CA (US)

(73) Assignee: INKA Biospheric Systems, Half Moon Bay, CA (US)

( * ) Notice: Subject to any disclaimer, the term of this patent is extended or adjusted under 35 U.S.C. 154(b) by 245 days.

(21) Appl. No.: 12/403,939

(22) Filed: Mar. 13, 2009

Related U.S. Application Data

(60) Provisional application No. 61/069,447, filed on Mar. 14, 2008.

(51) Int. Cl.
*A01G 31/00* (2006.01)

(52) U.S. Cl. .......... 47/62 R; 47/62 A; 47/62 N; 47/59 R

(58) Field of Classification Search .................. 47/62 R, 47/59 R, 64, 59 S, 60, 61, 62 A, 63, 62 N, 47/65.5, 65.9, 66.1, 66.6, 67, 39, 79, 80, 47/82, 83, 86, 87, 17, 1.4; 119/224, 215, 119/226, 200, 227
See application file for complete search history.

(56) References Cited

U.S. PATENT DOCUMENTS

| | | | |
|---|---|---|---|
| 2,747,331 A | 5/1956 | Steiner | |
| 2,807,912 A * | 10/1957 | Bjorksten | 47/58.1 R |
| 3,537,687 A | 11/1970 | Adelman | |
| 3,866,352 A | 2/1975 | Herveling et al. | |
| 4,038,779 A | 8/1977 | Roberts, Jr. et al. | |
| 4,295,296 A | 10/1981 | Kinghorn | |
| 4,379,375 A | 4/1983 | Eisenberg et al. | |
| 4,399,634 A | 8/1983 | O'Hare | |
| 4,407,092 A | 10/1983 | Ware | |
| 4,584,791 A | 4/1986 | Wolf | |
| 4,593,490 A | 6/1986 | Bodine | |
| 4,676,023 A | 6/1987 | Mori | |
| 4,908,985 A | 3/1990 | Dowell | |
| 5,031,359 A | 7/1991 | Moffett, Jr. | |
| 5,046,451 A * | 9/1991 | Inslee et al. | 119/227 |
| 5,073,401 A | 12/1991 | Mohr | |
| 5,363,594 A | 11/1994 | Davis | |
| 5,394,647 A | 3/1995 | Blackford, Jr. | |
| 5,608,989 A | 3/1997 | Behrens | |
| 5,826,375 A | 10/1998 | Black | |
| 6,021,602 A * | 2/2000 | Orsi | 47/62 A |
| 6,219,965 B1 | 4/2001 | Ishikawa et al. | |
| 6,240,674 B1 | 6/2001 | Otake et al. | |
| 6,393,764 B1 | 5/2002 | Smith | |
| 6,397,520 B1 | 6/2002 | Kosinski | |

(Continued)

*Primary Examiner* — T. Nguyen
(74) *Attorney, Agent, or Firm* — Dergosits & Noah LLP; Geoffrey T. Staniford

(57) ABSTRACT

Embodiments of a vertical aquaponic micro farm are described. The vertical aquaponic micro farm is designed to support and incorporate a variety of food growing and alternative energy devices, and can be used to grow plants, fish, and other similar organisms. The system incorporates a biologically active grow mat and filter system and combines a biological filter system with aquaculture, hydroponics, solar, wind, and battery technologies. The vertical aquaponic garden/farm represents a self-sustaining micro farm that can be set up in any area with exposure to sunlight and/or wind. It can be used in exterior locations, or interior applications with the addition of appropriate lighting systems. Depending on application, the system uses significantly less water that required for traditional farming. Water is recycled through the grow mat media bed (bio-mat) and a biologic filter, which can be inoculated with a culture of nitrifying bacteria in combination with the plant roots. This system eliminates nitrogen waste by metabolizing ammonia, nitrite and nitrates. If fish are present, the system converts the effluent from the fish pond into plant mass. The overall system then returns clean water back to the fish pond.

16 Claims, 6 Drawing Sheets

U.S. PATENT DOCUMENTS

| | | |
|---|---|---|
| 6,606,823 B1 | 8/2003 | McDonough et al. |
| 6,676,837 B2 | 1/2004 | Keeton, Jr. |
| 6,827,036 B2 | 12/2004 | Connolly |
| 7,143,544 B2 | 12/2006 | Roy |
| 7,168,206 B2 | 1/2007 | Agius |
| 7,243,460 B2 | 7/2007 | Darlington |
| 7,320,752 B2 | 1/2008 | Austin et al. |
| 7,536,827 B2 | 5/2009 | Busch et al. |
| 2002/0066414 A1* | 6/2002 | Hallock et al. ................ 119/248 |
| 2003/0104353 A1* | 6/2003 | Brielmeier et al. ............... 435/5 |
| 2005/0241231 A1 | 11/2005 | Bissonnette et al. |
| 2008/0155894 A1 | 7/2008 | Bissonnette et al. |
| 2009/0007486 A1* | 1/2009 | Corradi ......................... 47/62 R |
| 2009/0038221 A1* | 2/2009 | Poore, Jr. ..................... 47/62 R |

* cited by examiner

Vertical Aquaponic Garden

VERTICAL AQUAPONIC MICRO FARM

CROSS-REFERENCE TO RELATED APPLICATIONS

The current application claims the benefit of U.S. Provisional Patent Application No. 61/069,447 entitled "Vertical Aquaponic Micro Farm" and filed on Mar. 14, 2008, which is hereby incorporated by reference in it entirety.

FIELD

Embodiments of the invention relate generally to food growing systems, and more specifically, to a vertically-oriented, closed-loop aquaponic micro farm.

BACKGROUND

In many areas of the world, access to arable land and fresh water is significantly restricted. Such areas typically suffer from very low standards of living given the limited ability of people to grow food and the often harsh environmental conditions. Even in areas with relatively good levels of arable land and water, efficient food growth may be a challenge due to oversaturated growing conditions and/or seasonal land constraints. In all food growing environments the presence of weeds, vermin, pests, insects, and other parasitic organisms is a constant threat.

Variations in climate, soil conditions, and other factors generally limit the types of food crops that can be grown in any particular area. The advent of greenhouses has allowed the growing of certain crops in many regions of the world and times of the year that normally would not be optimal. Greenhouses, however, are typically large-scale, extensive structures that utilize expensive materials and can be costly to operate. Small-scale greenhouses have also been developed, but these structures are often expensive, complex and rely on heavy, expensive glass panels. This limits their portability and applicability to use in poor and developing regions. Another disadvantage associated with greenhouse systems is that they still require near normal amounts of water, soil nutrients, and space to grow crops in any significant amount.

What is needed, therefore, is a food growing system that provides an improved way to grow food where access to arable land and fresh water is restricted.

SUMMARY

Embodiments of a vertical aquaponic (or hydroponic) micro farm are described. This invention can be set up on the sides of buildings and on roof tops or places where arable land is not available. A large variety of plants, crops, and even fish can be cultivated in a relatively small area with minimal external energy use. Design and deployment aspects limit the ability for weeds, vermin, and insects to gain access to the growing environment, thereby minimizing or even eliminating the need for herbicides, pesticides and traps. In areas where water supply is scarce and or distant, the vertical aquaponic micro farm allows for the recycling of locally available water, and or grey water when conditions permit.

The vertical aquaponic micro farm is designed to support and incorporate a variety of food growing and alternative energy devices, and can be used to grow plants, fish, and other similar organisms. The system incorporates a biologically active grow mat and filter system and combines a biological filter system with aquaculture, hydroponics, solar, wind, and battery technologies. The vertical aquaponic garden/farm represents a self-sustaining micro farm that can be set up in any area with exposure to sunlight and/or wind. It can be used in exterior locations, or interior applications with the addition of appropriate lighting systems. Depending on application, the system uses significantly less water that required for traditional farming. Water is recycled through the grow media bed (bio-mat) and a biologic filter, which can be inoculated with a culture of nitrifying bacteria in combination with the plant roots. This system eliminates nitrogen waste by metabolizing ammonia, nitrite and nitrates. If fish are present, the system converts the effluent from the fish pond into plant mass. The overall system then returns clean water back to the fish pond.

Embodiments include a system to cycle a stream of water in a continuous loop through a fish pond and then through a hydroponic subsystem. In this fashion, the effluent from the fish pond provides nutrients for the roots and microorganisms of the hydroponic system. This effectively fertilizes the plants and clears the toxin out of the water for the fish. Grey and other recycled water sources can be cycled through this, thereby reusing water that might otherwise have been wasted.

Embodiments of the aquaponic micro farm include power generation components to sustain or support the system. These power generation components may include wind turbines, water turbines, solar panels, fuel cells, and other similar power sources. The power accumulated by these devices can be stored in battery banks, capacitors, or other electrical power storage devices. If desired, the stored DC energy may be converted to AC power by an inverter. Alternatively, a local power supply may be used. Such power support can be used to run an electric circulation pump, ultra violet filter, laptop computer, telecommunication system, radio, lights, electric controllers, or other electrical circuits. Certain items, such as the pumping system may be directly driven by certain types of power. For example, wind energy can be used to directly drive the pumping system.

Advantages of embodiments of the system include both health and economic benefits resultant from enhanced ability to cultivate fresh produce, herbs and fish in a reduced footprint. The ability to configure the system in a vertical orientation such as mounting the on a wall or the roof of a building, allows for deployment in a wide variety of environments and can be used by individuals, households, small businesses, and so on, for the creation of a new income base from any number of crops, such as fruits, herbs, vegetables, flowers, and fish.

Another advantage of the disclosed system is that the harm associated with many traditional pest and animals is dramatically reduced because the growing beds are set vertically and are isolated from the ground, in certain embodiments. Therefore, access to certain pests (e.g., rodents and other non-flying pests is minimized). This can result in a minimization of the uses of pesticide, herbicides, or traps.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

BRIEF DESCRIPTION OF THE DRAWINGS

Embodiments are illustrated by way of example and not limitation in the figures of the accompanying drawings, in which like references indicate similar elements.

DETAILED DESCRIPTION

Embodiments of a vertical aquaponic micro farm are described. In the following description, numerous specific details are introduced to provide a thorough understanding of, and enabling description for, embodiments of the system. One skilled in the relevant art, however, will recognize that these embodiments can be practiced without one or more of the specific details, or with other components, systems, and so on. In other instances, well-known structures or operations are not shown, or are not described in detail, to avoid obscuring aspects of the disclosed embodiments.

Figure 1:
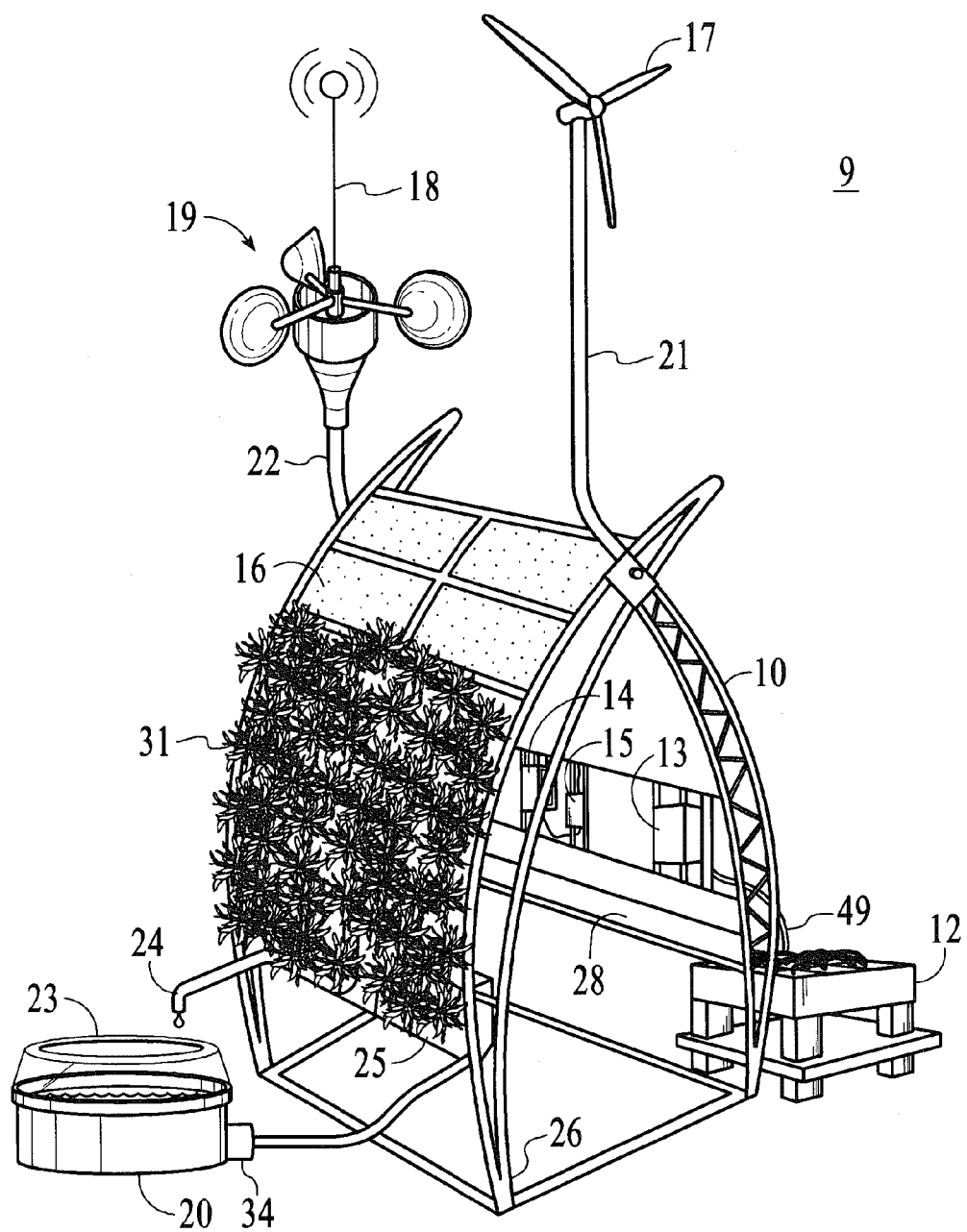
FIG. 1 is a first perspective view of a vertical aquaponic micro farm, according to an embodiment.

FIG. 1 is a first perspective view of a vertical aquaponic micro farm, according to an embodiment. In one embodiment, the vertical aquaponic micro farm comprises a scaffolding parabolic arch support structure with power systems, grow systems, and power storage/management unit, and certain communications capabilities provided through a telecommunication mast.

FIG. 1 illustrates a vertical aquaponic micro farm structure 9 under cultivation with actively growing plants 31 growing in or on a hydroponic garden bio media. Also shown as a grow product are fish within fish pond 20 that may be coupled to the farm structure 9. The micro farm 9 essentially comprises a parabolic or other shape scaffolding 10 having attached two vertical masts 21 and 22 for supporting a wind turbine 17, a telecommunication mast 18, and a weather station 19. As shown, two sets of parabolic scaffolding structures are separated by a certain distance and coupled together through a series of horizontal beams. The separation distance and the height of the scaffolding generally defines the size of the microfarm structure, and this can be set to many different dimensions, depending on needs and size constraints. A series of solar panels 16 and electrical storage bank 12 provide power for the fish pond pump and ultraviolet (UV) filter system. Details of the pump and filter system are shown more clearly in FIGS. 3 and 4, discussed in greater detail below.

The weather station 19 can include one or more devices for measuring certain environmental conditions. These conditions can include wind speed, wind direction, air temperature, humidity, barometric pressure, and other relevant conditions. The telecommunications mast can support a radio antenna aerial, or other communications device, as well as other systems, such as a GPS (global positioning system) device.

The micro farm system 10 incorporates a biologically active grow mat and filter system and combines a biological filter system with aquaculture and hydroponics technologies. Centrally positioned on the parabolic scaffolding 10 is a substantially vertical hydroponic plant growing system. In one embodiment, plants 31 are planted into a series of vertically set, vegetable fiber or food grade fiber bio-mats, which may additionally include activated carbon filtration mats. Alternatively the fiber bio mat substrate may be replaced with stones, glass or brick fragments, or any combination thereof.

In a general implementation, water is recycled through the grow media bed (bio-mat) and a biologic filter, which can be inoculated with a culture of nitrifying bacteria in combination with the plant roots. For an embodiment in which a fish pond is present, water from the fish pond 20 is pumped out of the pond through an intake vent and then passed through the ultra violet filter for the purpose of sterilizing the water from free floating bacteria, parasites, and algae, through a return pipe and into an upper irrigation reservoir. The water flows through an irrigation distribution head and sediment filter, which evenly distributes water and filters out large particulate, onto the top edge of the bio-mats.

As shown in FIG. 1, the water passes through three bio-mats that have been inoculated with beneficial bacteria (e.g., Nitrosamines and Nitrobacteria) that convert ammonia into nitrite, and then nitrite into nitrate, so that plants 31 can metabolize. As the water passes through the bio-mats, effluent and nutrients are metabolized by the plant roots and the beneficial bacteria. The water is collected in the irrigation catchment trough 25, then returned to the fish pond 20 through the outflow pipe 24. The water is returned to the fish pond clear of materials harmful to the fish and at the same time provides a food source for the plants. The water in system 9 is run on a closed, continuous recirculation loop.

Figure 2:
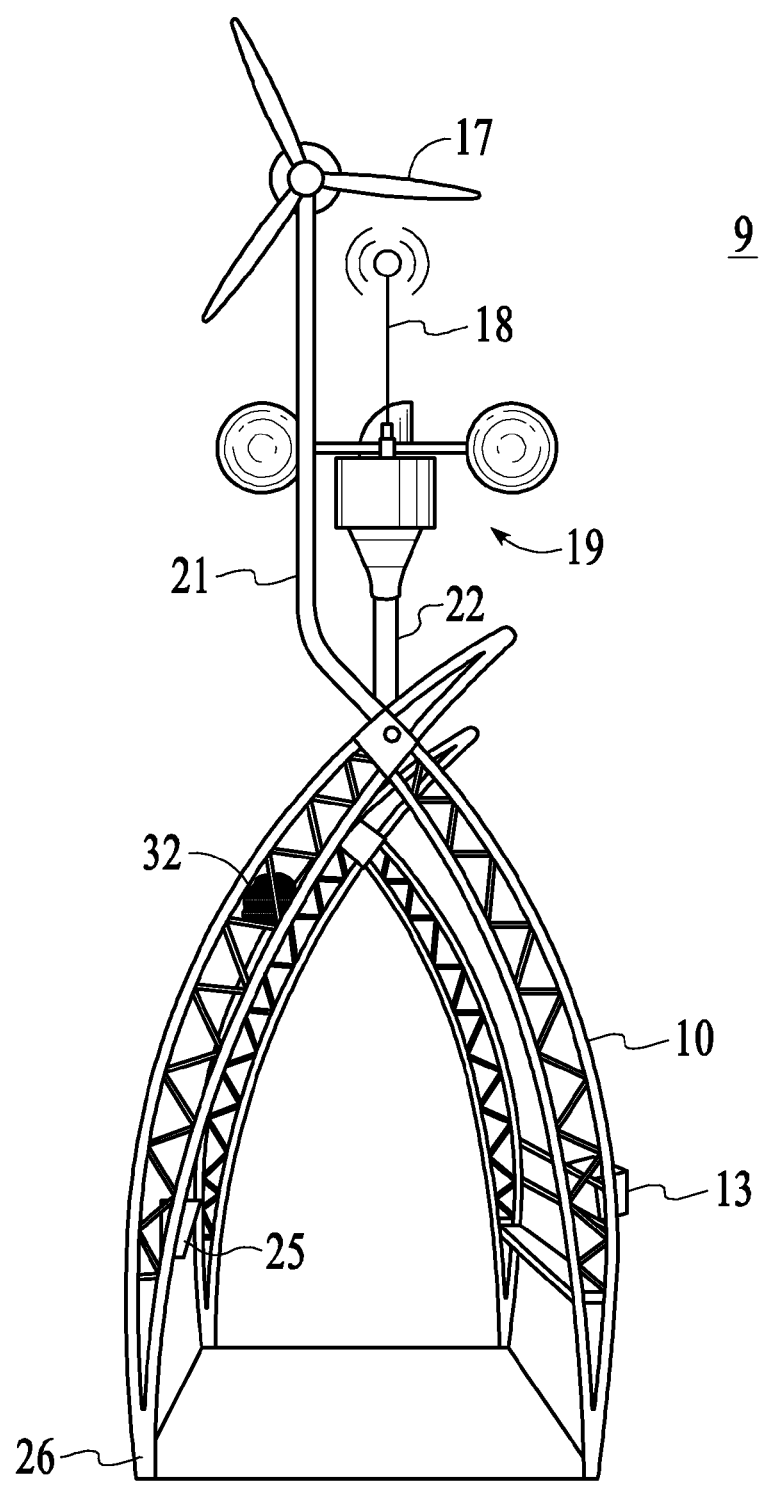
FIG. 2 is a detailed side profile elevation view of a parabolic arched truss scaffolding, wind turbine, and inverter for a vertical aquaponic micro farm, according to an embodiment.

FIG. 2 is a side profile elevation view of the vertical aquaponic micro farm of FIG. 1. As shown in FIG. 2, the parabolic truss scaffolding 10 supports several system components and is provided in a shape and size appropriate for specific crop growth and environmental conditions. In one embodiment, the scaffold structure 10 supports a wind turbine 17 that produces electricity from wind power. This power is sent to a voltage regulator 15 and then sent the electrical storage bank 12. The scaffold can also be configured to support one or more solar panels 16. The power generated from the wind turbine 17 and solar panels 16 is stored in the electrical storage bank 12, which can be a battery bank or similar storage unit (e.g., capacitor). The system can also be powered by conventional AC power source where available. The power is used upon demand by the recirculation pump and the ultra violet filter, and any other electrical device in the system. In one embodiment, the scaffold structure 10 also supports a rock grow media 32.

Figure 3:
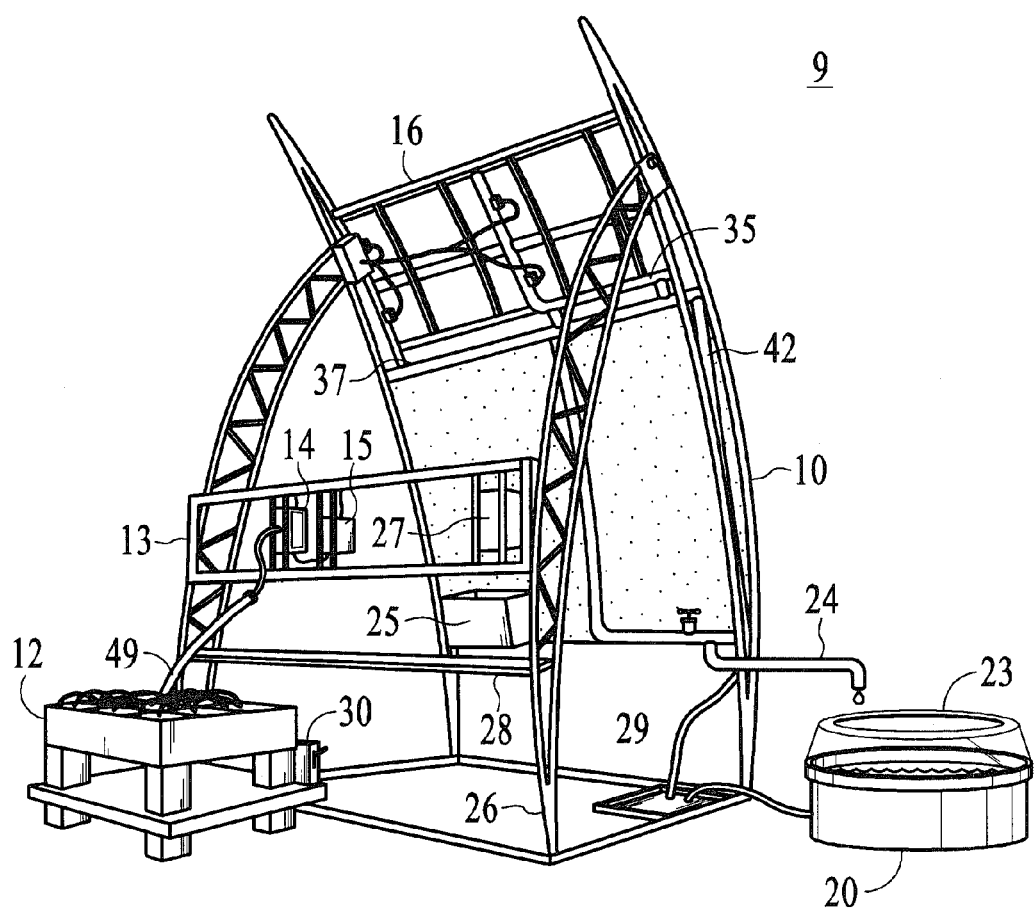
FIG. 3 is a detailed rear elevation view of the scaffolding structure of FIG. 2, with a fish pond, power storage/management system, and pump housing, under an embodiment.

FIG. 3 is a detailed rear elevation view of the scaffolding structure of FIG. 2. FIG. 3 shows in more detail, the configuration and placement of the fish pond 20, electrical storage bank 12, power management circuits, recirculation pump housing 29, and other units of micro farm 9. Attached to the rear frame of the parabolic scaffolding through a mounting on the back brace is a power inverter and management unit 13, telecommunication system 14, voltage regulator 15, and a weather station/anemometer 27. All electrical devices are wired to the circuit breaker box 30 for power control. Power is supplied to and from the power sources and electrical devices to the storage bank 12 through power cable 49.

The entire parabolic scaffolding may be set on a steel foundation brace 26 for added stability. Alternatively, the scaffolding posts be set in concrete or equivalent foundations for permanent or semi-permanent deployment. In a further alternative embodiment, the scaffolding structure may be placed on wheels or movable pallets for mobile or temporary deployments.

As shown in FIG. 3, the fish pond 20 can include a guard or other type of lid 23 to prevent vermin from having access to the pond. A potting table 28 may also be provided within the structure of scaffold 10.

Figure 4:
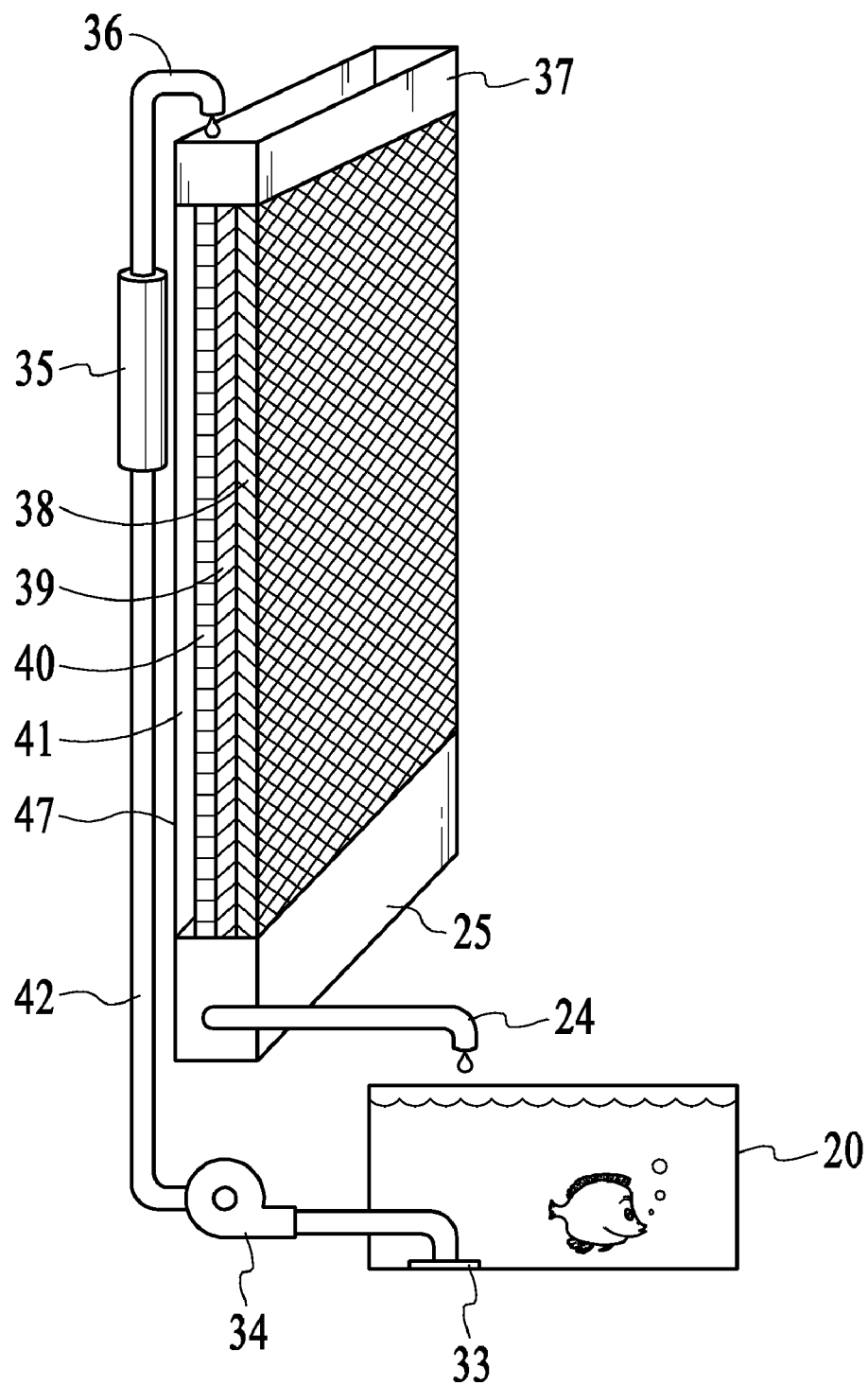
FIG. 4 is a detailed elevation view of a biological system for the hydroponic and aquaculture systems of a vertical aquaponic micro farm, according to an embodiment.

FIG. 4 is a detailed elevation view of a biological system for the hydroponic and aquaculture system, under an embodiment. FIG. 4 also provides a diagram of a recirculation flow chart, according to the operation of the micro farm system. As shown in FIG. 4, fish, which may be used as a human food source, are raised in the fish pond 20. The water in the fish pond collects waste from the fish, dead plants, uneaten fish food, and other biological residue. These are passed as part of the nutrient load in the water incorporating ammonia, nitrites, nitrates, and nitrogen. The water and both soluble and solid wastes are sucked up from the floor of the fish pond 20 and recycled through a biological filter system. In embodiment, the biological filter system comprises a set of bio-mats 38, 39, and 40 on which plants are grown. The water flows down through the set of bio-mats 38, 39, and 40, which can be mats comprised of vegetable fibers and activated carbon. The bio mats have are inoculated with the beneficial bacteria and nutrients (e.g., nitrobacteria and nitrosamines) for the purpose of breaking down the ammonia and nitrite load in the water and converting components in the effluent into nitrate, a plant food.

For the system of FIG. 4, water is taken from fish pond 20 through a pond water intake vent 33 by recirculation pump 34. The water is fed through tube 42 which comprises the plumbing for the irrigation system to an ultra violet filter/sterilization unit 35. The water is then fed out of water return pipe 36 through an upper irrigation reservoir 37. The water then passes through vegetable fiber bio-mat 38, secondary vegetable fiber bio-mat 39, and activated carbon filter 40. The water then flows through irrigation catchment trough and out of the outflow pipe 24 back into the fish pond 20.

The bio-mat and filter system 38, 39, and 40 are illustrated as three separate mat like components of the same size deployed in a sandwich array. It should be noted, however, that this filter and plant substrate system can be composed of mats and/or filters of any appropriate size, shape and material depending upon configuration and needs. For example, any practical number of bio-mats (e.g., 1-4) may be used, and the filter 40 may be separate or integrated within the one or more mats. As shown in FIG. 4, the bio-mat and filter structure is disposed proximate to an area 41, which represents space for the plant roots. The embodiment of FIG. 4 also shows a wall garden housing 47 for deployment of the bio-mat/filter structure in a vertical orientation as mounted on a wall, hanging from a frame, or mounted on a scaffold structure, as shown in FIG. 1.

Figure 5:
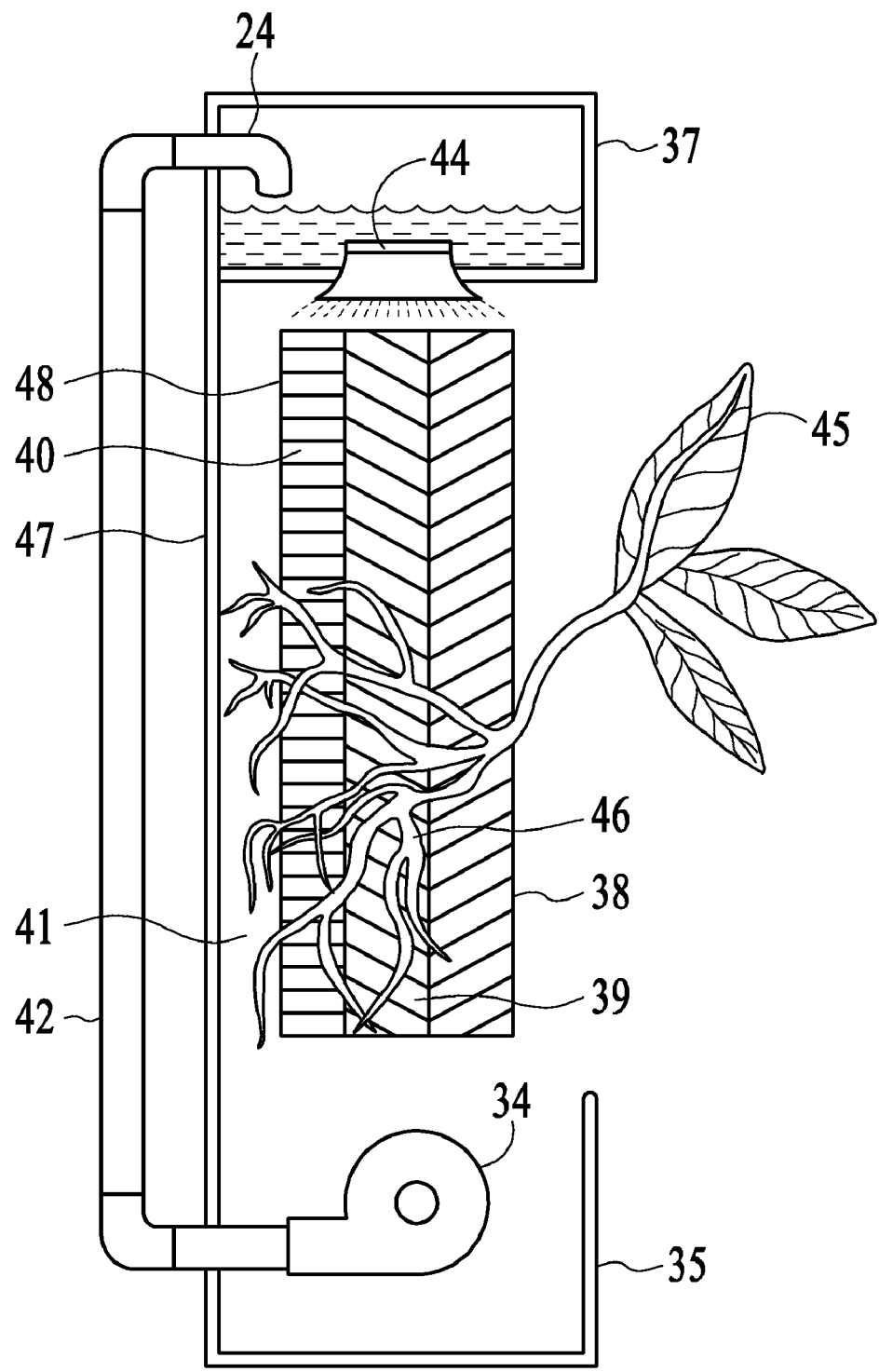
FIG. 5 is a schematic view of a hydroponic vertical garden and a bio-mat grow media system, under an embodiment.

FIG. 5 is a schematic view of a hydroponic vertical garden and a bio-mat grow media system, under an embodiment. As shown in FIG. 5, a plant 45 is planted substantially perpendicularly into the vegetable fiber or food grade plastic mats 38 and 39. The plant is held in place by the first bio-mat 38 and the roots pass through and grow through the second bio-mat 39 and continue growing into the third bio-mat 40, which may be an activated carbon filter or additional bio-mat layer. The bio-mat/filter assembly is held in place by a bio-mat holder frame 48. The activated carbon filter 40 helps filter the water supply, adds a carbon nutrient for the plant roots and provides a surface area for microorganism colonies that aids in the bio digestion of the nitrogen load in the water supply and helps with filtering hydrocarbons from the air that are breathed in through the plants leaves and xylem by the photosynthesis and evapo-transpiration cycle. After passing through the bio-mat/filter structure and the plant roots 46, the water is collected in the irrigation catchment trough 25 and passed back to the fish pond 20, through the outflow pipe 24. The recirculation pump 35 in trough 25 pumps the water back up plumbing to continue the water cycle in a closed loop. In an embodiment, water from the outflow pipe 24 is passed through an irrigation distribution head and sediment filter 44 which is disposed within an upper irrigation reservoir 37.

Figure 6:
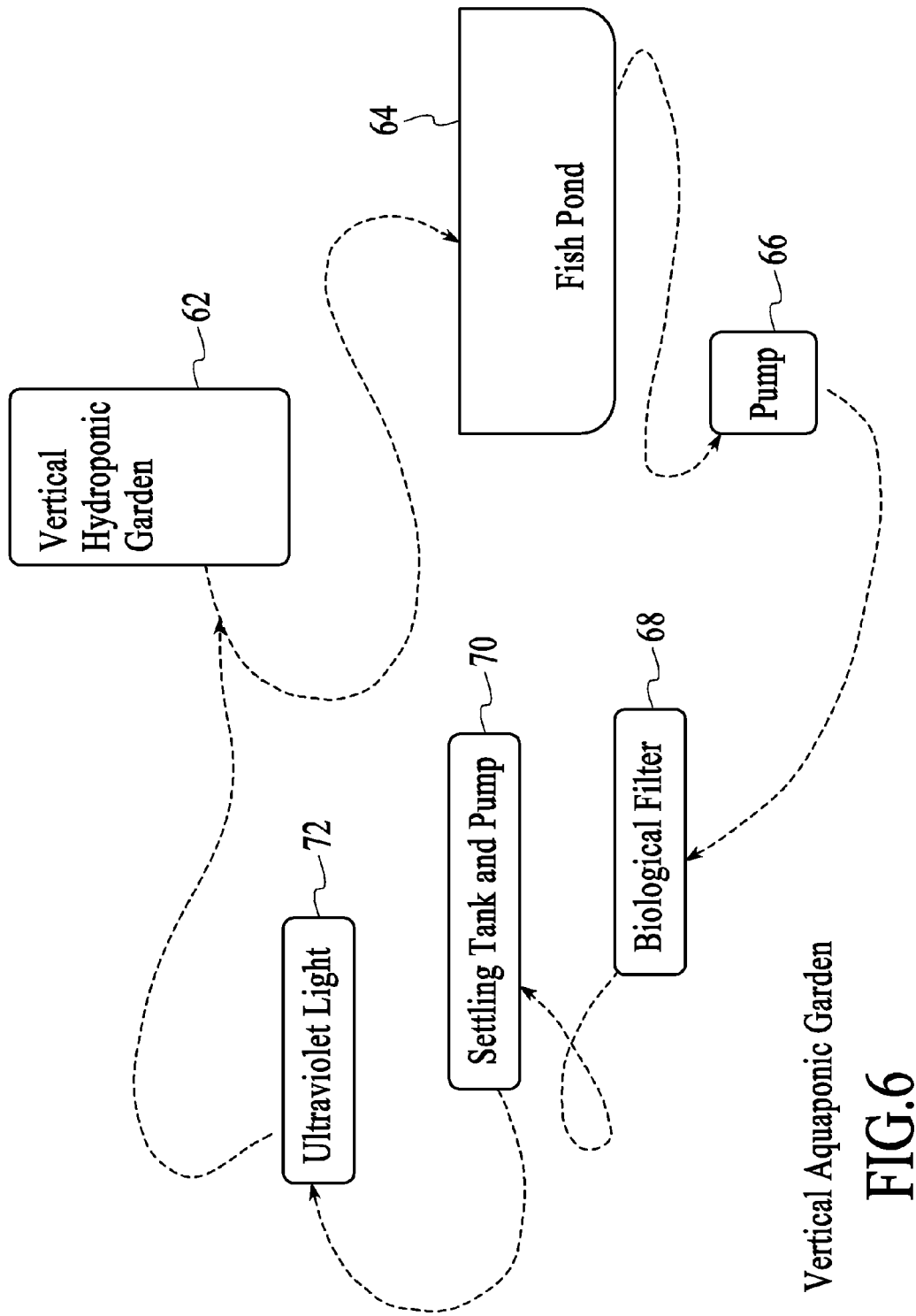
FIG. 6 is a flow diagram of process flows in a fishpond-based a vertical aquaponic micro farm, according to an embodiment.

FIG. 6 is a flow diagram of process flows in a fishpond-based a vertical aquaponic micro farm, according to an embodiment. The flow diagram illustrates the closed-loop process of flow between the fish pond 62 and vertical hydroponic garden 64. In this process flow, water is pumped from fish pond 64 through pump 66 to a biological filter 68. The water is then passed to a settling tank and pump 70 through an ultraviolet light 72. Water from the vertical hydroponic garden 62 also passes through ultraviolet light 72 and to the fish pond 62.

The vertical aquaponic garden allows a form of farming or gardening that is suitable for virtually any size flat or vertical surface. The biological systems can be mounted on a parabolic or other shape scaffolding 10 for better placement of components and to support an aquaponic food production system 9. For example, the parabolic scaffolding could be a square scaffolding support structure or a dome shaped scaffolding structure. Alternatively, no scaffolding may be used and the system may instead be flat mounted on a vertical (wall) or horizontal (ground) surface. Thus, the biological recirculation system can be wall mounted, as shown in FIG. 5 with wall mounting housing 47. For flat farming options, the housing 47 can be placed horizontally rather than vertically and run on a hydroponic growing system.

The scaffolding can be designed as a parabolic arch shaped structure, or any similar shape that is suitable to position the bio-mats in a vertical orientation, or at any angle desired. The scaffolding may be made of any number of materials, such as steel, aluminum, plastic, wood, bamboo, and carbon fiber, or any other suitable material depending upon cost, location, and environmental factors.

Other alternative embodiments of the vertical aquaponic micro farm are possible. For example, it is possible to run the vertical garden system without the aquaculture component FIG. 5. In the absence of the aquaculture component, nutrients and microorganisms can be added to the water system 37 by pouring a mixture of nutrients and microorganisms directly into the water supply or the irrigation catchment trough 25, as needed.

The bio-mats 38 and 39 could be built from many different fiber materials and mesh designs. The bio-mat structures can comprise baskets of stone, glass, charcoal or other locally available substrates.

Embodiments include one or more electrical circuits, but are not so limited. Such embodiments can be powered by many different power sources, including wind, solar, AC power, fuel cell systems, internal combustion engines, human powered generators, and so on. Wind power can be provided by a wind turbine 17 mounted on a mast 21 directly connected to the scaffold structure 10, or any similar fan or prop that can be used to harness wind power.

The system can be installed indoors with the addition of an appropriate light system or out doors with natural sun light. The bio-mats can be seeded directly as is conventionally done with soil-based plants. The bio-mat system can also be pre-seeded, sprouted and placed into a vertical garden, as seasonal conditions permit.

The system may include certain environment monitoring devices to optimize deployment in certain regions and conditions. These can include a wind speed gauge 19 and certain weather station devices or radio aerials provided on a telecommunication mast 18, and or a mast 22.

An embodiment is directed to an apparatus comprising a support structure, a plurality of bio-mats placed on the support structure in a substantially vertical orientation, the bio-mats supporting the growth of one or more varieties of plants, a water source coupled to the bio-mats through a pump and plumbing system, wherein the plumbing system is configured to draw water from the water source through the bio-mats and back to the water source in substantially closed loop aquatic system, and one or more power generation components providing electrical energy to the pump and plumbing system. The apparatus of claim 1 wherein the support structure is a parabolic arch support structure. The parabolic arch support structure may comprise two sets of interlinked scaffolds coupled to each other by a plurality of horizontally disposed beams, and the support structure may be constructed of a material such as steel, aluminum, plastic, wood, bamboo, or carbon fiber.

In an embodiment, the bio-mats are inoculated with beneficial bacteria to convert ammonia into nitrite, and then convert the nitrite into nitrate to allow plants seeded thereon to metabolize. The apparatus may further have an irrigation catchment trough to collect water passing through the biomats for return to the water source. The water source can be a fish pond including one or more live fish. The water provided to the plants contains impurities and nutrients from the fish pond, and the plumbing includes one or more filter components to filter the water from the biomats to provide water back to the fish pond clear of materials harmful to the fish. At least some of the filter components can be in the form of a biomats, and the biomats may consist of a material such as a fibrous mesh material, and a basket of stone, glass or charcoal. A guard structure may be placed over the fish pond to prevent intrusion by vermin and pests.

The apparatus can include a weather station mounted on a mast coupled to the support structure, with the weather station including devices for measuring certain environmental conditions such as wind speed, wind direction, air temperature, barometric pressure, and humidity. A radio system or antenna may be mounted on a second mast coupled to the support structure. The power generation components can include wind turbines, water turbines, solar panels, AC electrical power, human-powered generators, batteries, and fuel cells.

Embodiments are also directed to a closed-loop aquatic and closed-loop electrical system for growing plants comprising: a support structure, a plurality of bio-mats placed on the support structure in a substantially vertical orientation, the bio-mats supporting the growth of one or more varieties of plants, a water source coupled to the bio-mats through a pump and plumbing system, wherein the plumbing system is configured to draw water from the water source through the bio-mats and back to the water source in substantially closed loop aquatic system, and one or more power generation components generating power from non-electrical grid-based power sources, and a power storage system storing power generated by the power generation components and providing electrical energy to the pump and plumbing system to provide power in a substantially closed-loop electrical system. In this system, the plumbing system comprises one or more water pumps and filters, and the power generation circuits may include wind turbines, water turbines, solar panels, and human-powered generators.

Independent of any particular structure, embodiments are also directed to a method of growing plants comprising: providing a plurality of biomats in a substantially vertical orientation relative to the ground, seeding the biomats with plant matter, providing a water source coupled to the biomats through a pump and plumbing system, the water source including water enriched with nutrients and impurities, pumping enriched water through the biomats from the water source, filtering the enriched water from the biomats to produce clean water, and returning the clean water to the water source in a substantially closed-loop aquatic system.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the vertical aquaponic micro garden is not intended to be exhaustive or to limit the embodiments to the precise form or structures disclosed. While specific embodiments of, and examples for, the micro farm are described herein for illustrative purposes, various equivalent modifications are possible within the scope of the described embodiments, as those skilled in the relevant art will recognize.

The elements and acts of the various embodiments described above can be combined to provide further embodiments. These and other changes can be made to the location-based social network manager process in light of the above detailed description.

In general, in any following claims, the terms used should not be construed to limit the described system to the specific embodiments disclosed in the specification and the claims, but should be construed to include all operations or processes that operate under the claims. Accordingly, the described system is not limited by the disclosure, but instead the scope of the recited method is to be determined entirely by the claims.

While certain aspects of the vertical aquaponic micro farm, according to an embodiment are presented below in certain claim forms, the inventor contemplates the various aspects of the methodology in any number of claim forms. Accordingly, the inventor reserves the right to add additional claims after filing the application to pursue such additional claim forms for other aspects of the described systems and methods.

What is claimed is:

1. An apparatus comprising:
a support structure is a parabolic arch support structure comprises a truss-based structure having two sets of interlinked scaffolds coupled to each other by a plurality of horizontally disposed beams;
a plurality of bio-mats placed on the support structure in a substantially vertical orientation, the bio-mats supporting the growth of one or more varieties of plants, wherein each bio-mat of the plurality of bio-mats comprises a composite layered assembly including a first vegetable fiber mat layer, a second vegetable fiber mat layer and an activated carbon filter layer wherein the plurality of bio-mats are arranged along a bottom portion of the support structure;
a water distribution system arranged along an upper portion of the support structure and configured to flow water to the bio-mats back to a water source placed adjacent the support structure to form a substantially closed loop aquatic system; and one or more power generation components providing electrical energy the water distribution system.

2. The apparatus of claim 1 further comprising one or more solar panels coupled to the one or more power generation components are arranged along an upper portion of the support structure.

3. The apparatus of claim 1 wherein the support structure is constructed of a material selected from the group consisting of: steel, aluminum, plastic, wood, bamboo, and carbon fiber.

4. The apparatus of claim 1 wherein the bio-mats are inoculated with beneficial bacteria to convert ammonia into nitrite, and then convert the nitrite into nitrate to allow plants seeded thereon to metabolize.

5. The apparatus of claim 4 further comprising an irrigation catchment trough to collect water passing through the biomats for return to the water source and further comprising a pump and plumbing system, wherein the plumbing system is configured to draw water from the water source for distribution through the plurality of bio-mats.

6. The apparatus of claim 5 wherein the water source comprises a fish pond including one or more live fish.

7. The apparatus of claim 6 wherein the water provided to the plants contains impurities and nutrients from the fish pond, and wherein the plumbing includes one or more filter components to filter the water from the biomats to provide water back to the fish pond clear of materials harmful to the fish.

8. The apparatus of claim 7 wherein at least some of the filter components comprise one or more of the biomats, and wherein the biomats consist of a material selected from the group consisting of a fibrous mesh material, and a basket of stone, glass or charcoal.

9. The apparatus of claim 8 further comprising a guard structure placed over the fish pond to prevent intrusion by vermin and pests.

10. The apparatus of claim 8 further comprising an ultraviolet filter system.

11. The apparatus of claim 1 further comprising:

a weather station mounted on a first mast coupled to the support structure, wherein the weather station includes devices for measuring certain environmental conditions selected from the group consisting of: wind speed, wind direction, air temperature, barometric pressure, and humidity; and a radio system mounted on a second mast coupled to the support structure.

12. The apparatus of claim 1 wherein the power generation components are selected from the group consisting of: wind turbines, water turbines, solar panels, AC electrical power, human-powered generators, batteries, and fuel cells.

13. The apparatus of claim 1 further comprising a base coupled to the support structure to allow free standing of the support structure on a substantially horizontal surface.

14. The apparatus of claim 1 further comprising a vertical mounting component coupled to the support structure to allow mounting of the support structure on a substantially vertical surface.

15. A closed-loop aquatic and electrical system for growing plants comprising:

a truss-based scaffolding support structure is a parabolic arch support structure comprises two sets of interlinked scaffolds coupled to each other by a plurality of horizontally disposed beams;

a plurality of bio-mats placed on the support structure in a substantially vertical orientation, the bio-mats supporting the growth of one or more varieties of plants, wherein each bio-mat of the plurality of bio-mats comprises a composite layered assembly including a first vegetable fiber mat layer, a second vegetable fiber mat layer and an activated carbon filter layer wherein the plurality of bio-mats are arranged along a bottom portion of the support structure;

a water distribution system arranged along an upper portion of the support structure and configured to flow water to the bio-mats back to a water source placed adjacent the support structure to form a substantially closed loop aquatic system; and one or more power generation components generating power from non-electrical grid-based power sources; and a power storage system storing power generated by the power generation components and providing electrical energy the water distribution system to provide power in a substantially closed-loop electrical system.

16. The system of claim 15 further comprising a plumbing system having one or more water pumps and filters, and the power generation circuits are selected from the group consisting of: wind turbines, water turbines, solar panels, and human-powered generators.

* * * * *